May 1, 1928.

H. WEICHSEL

ALTERNATING CURRENT MOTOR

Filed April 4, 1925

1,668,177

INVENTOR
Hans Weichsel
BY
ATTORNEY

Patented May 1, 1928.

1,668,177

UNITED STATES PATENT OFFICE.

HANS WEICHSEL, OF ST. LOUIS, MISSOURI, ASSIGNOR TO WAGNER ELECTRIC CORPORATION, OF ST. LOUIS, MISSOURI, A CORPORATION OF DELAWARE.

ALTERNATING-CURRENT MOTOR.

Application filed April 4, 1925. Serial No. 20,619.

My invention relates to automatically operated means for reorganizing circuits in self-excited synchronous induction motors and other machines having similar characteristics upon which the operation of my invention depends.

The object of my invention, in the embodiment herein described, is to dispense with the necessity of manipulation of controlling devices during the starting operation of a synchronous-induction motor, and to permit the machine to be started by simply closing the line switch.

Figure 1:
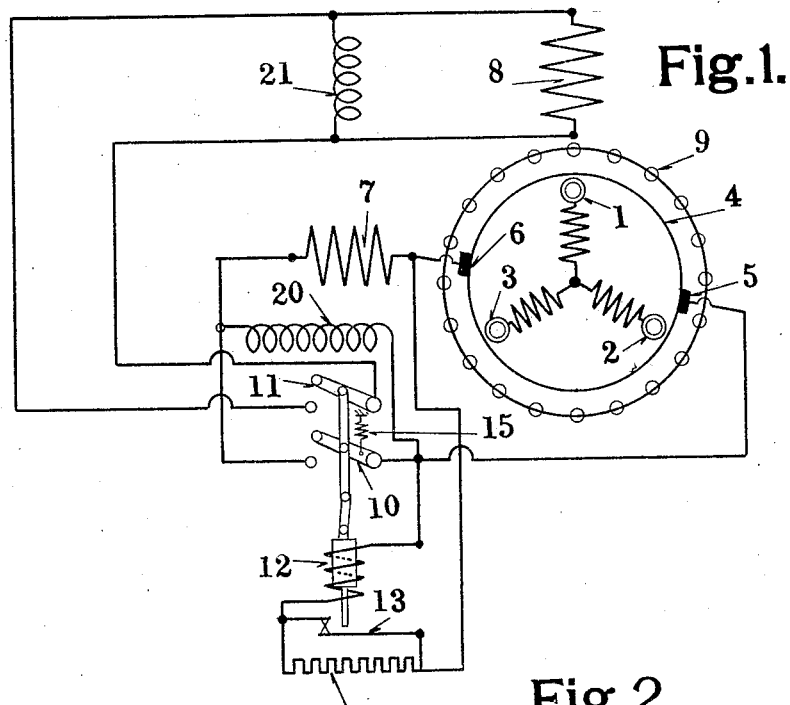
Figure 2:
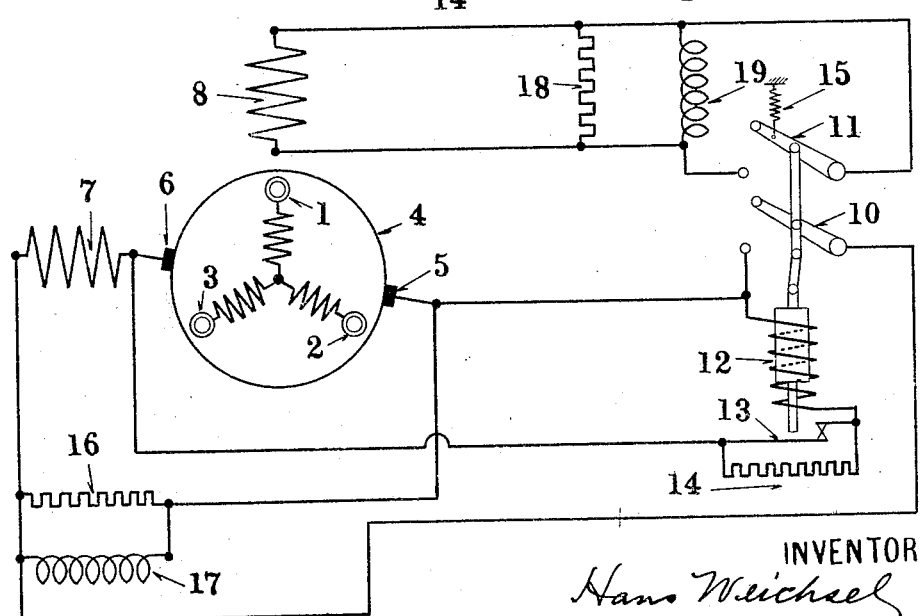

In the accompanying drawings Figure 1 illustrates one embodiment of my invention, and Figure 2 another embodiment.

Referring to Figure 1, the rotor carries a polyphase winding supplied with line current through slip rings 1, 2, 3, and a commuted winding 4 with which brushes 5, 6 cooperate. The induced member—in this case the stator—is provided with an exciting winding 7 and with a second winding 8 displaced therefrom. The stator is also provided with a high resistance squirrel-cage winding 9. Switch blade 10, when in closed position, connects the winding 7 in circuit with the brushes, and switch blade 11 short-circuits the winding 8. Switch blades 10 and 11 are simultaneously operated by means of a frequency relay 12 connected across the brushes 5, 6. This relay, when in closed position, also holds open a switch 13 whereby resistance 14 is included in the relay circuit.
Under conditions hereinafter referred to, I may also employ reactances 20 and 21 connected across the windings 7 and 8 respectively.

Referring to the operation of the machine described, at starting the high resistance squirrel-cage winding 9 cooperates with the polyphase winding on the rotor to produce a good starting torque without excessive starting current, but this torque decreases with increasing speed, and the maximum speed resulting from the interaction of the squirrel-cage winding and the polyphase winding is below synchronous speed.

At the moment of starting an E. M. F. of line frequency appears at the brushes 5, 6 and is impressed on the relay 12. The resistance of the spring 15 is, however, so proportioned with respect to the relay ampere turns then existing, that the relay cannot operate the switches which it controls. As the speed of the motor increases the frequency of the E. M. F. at the brushes 5, 6 decreases and consequently the current strength in the relay circuit increases since the voltage appearing at the brushes 5, 6 remains constant. The relay and the spring 15 are so proportioned that at approximately 80% of the synchronous speed the relay will close the switches 10 and 11 and thus place the exciting winding 7 in circuit with the brushes and short-circuit the winding 8. These windings then act as polyphase secondary windings producing an induction motor torque, supplementing the torque produced by the squirrel-cage winding and, while the induction motor torque decreases as synchronous speed is approached, the E. M. F. impressed on the winding 7 from the brushes 5, 6, the frequency of which decreases with increasing speed, produces a low frequency current in winding 7 which cooperates with the rotor flux to bring the machine into synchronism with a good synchronizing torque.

The reactances 20 and 21 may be employed when, on account of the character of the load, it is desirable that the torque be not allowed to fall, during any portion of the starting period, to much below its initial value. When these reactances are used the windings 7 and 8 also contribute to the starting torque before the relay operates because as the frequency of the voltage induced in windings 7 and 8 falls within increasing speed, the induced currents approach the phase of this voltage and consequently come into a phase relation to the motor field in which they contribute to the torque of the machine.

As indicated in the drawings, the armature of the relay is provided with an extension which opens the switch 13 at the same time that switches 10 and 11 are closed, thereby introducing resistance 14 into the relay circuit and limiting the relay current to a value just sufficient to hold the switches 10 and 11 in closed position.

In the modification illustrated in Figure 2, the high resistance squirrel-cage winding is omitted and winding 7 is permanently in circuit with the brushes 5, 6, and the winding 8 is permanently in closed circuit. However, during the starting period the circuit of the winding 7 includes non-inductive resistance 16 and the reactance 17 connected in parallel. The circuit of the winding 8 at starting also includes the non-inductive resistance 18 and the reactance 19 connected in parallel. These resistances and reactances are so proportioned that they suitably limit the starting current, and since the frequency of the currents induced in the windings 7 and 8 decreases with increasing speed, the resistance of the parallel combinations of resistance and reactance decreases with increasing speed permitting the currents to have approximately the desired operating values.

For the reason that the overload capacity of the machine as an asynchronous motor is reduced by the presence of the resistance-reactance combination described, and since, if the reactances were to be left in circuit during the operation of the machine they should be of larger size than if used only during the starting period, I utilize, in the manner shown in Figure 2, the frequency relay device described in connection with Figure 1, to short-circuit the resistance-reactance combinations in the circuits of windings 7 and 8 preferably so adjusting the relay that this short circuiting takes place at approximately 80% of synchronous speed.

It will be noted from the foregoing that by the utilization of the characteristics of a synchronous induction machine to control the circuits of the induced member by opening and closing them or modifying their resistance, I have produced a machine which automatically has proper starting characteristics and does not require manually operated starters.

Having fully described my invention, what I claim as new and desire to secure by Letters Patent of the United States is:

1. In an alternating current motor, the combination of an inducing member having an inducing winding and a commuted winding, an induced member provided with an exciting winding and an auxiliary winding, brushes cooperating with the commuted winding, and means governed by the frequency of the brush current for controlling the circuits of the exciting and auxiliary windings.

2. In an alternating current motor, the combination of an inducing member having an inducing winding and a commuted winding, an induced member provided with an exciting winding, brushes cooperating with the commuted winding, means governed by the frequency of the brush current for directly connecting the exciting winding in circuit with the commuted winding, said means being adapted to operate after the motor has started but at a speed substantially below the synchronous speed, and a second winding on the induced member closed circuited at starting.

3. In an alternating current motor, the combination of an inducing member having an inducing winding and a commuted winding, an induced member provided with an exciting winding and a high resistance closed circuited winding, an auxiliary winding displaced from the exciting winding, a frequency relay in circuit with the commuted winding, and means actuated by said relay to connect the exciting winding directly in circuit with the commuted winding and to short-circuit the auxiliary winding, said relay being adapted to operate after the motor has started but at a speed below the synchronous speed.

4. In an alternating current motor, the combination of an inducing member having an inducing winding and a commuted winding, an induced member provided with an exciting winding and a high resistance closed circuited winding, a reactance in circuit with the exciting winding, an auxiliary winding displaced from the exciting winding, a reactance in circuit with said auxiliary winding, a frequency relay in circuit with the commuted winding, and means actuated by said relay to connect the exciting winding directly in circuit with the commuted winding and to short-circuit the auxiliary winding, said relay being adapted to operate after the motor has started but at a speed below the synchronous speed.

5. In an alternating current motor, the combination of an inducing member, an induced member provided with a high resistance closed circuited winding and a second winding closed over a reactance, and means for connecting said second winding in circuit with the inducing member independently of said reactance.

In testimony whereof, I have hereunto set my hand this the 1st day of April, 1925.

HANS WEICHSEL. [L. S.]